United States Patent [19]

Ozaki et al.

[11] Patent Number: 4,780,075

[45] Date of Patent: Oct. 25, 1988

[54] DIES FOR EXTRUSION-SHAPING CERAMIC HONEYCOMB STRUCTURAL BODIES

[75] Inventors: Sei Ozaki, Aichi; Shoji Futamura, Kawasaki, both of Japan

[73] Assignees: NGK Insulators, Ltd., Nagoya; Institute of Technology Precision Electrical Discharge Works, Kawasaki, both of Japan

[21] Appl. No.: 28,708

[22] Filed: Mar. 23, 1987

[30] Foreign Application Priority Data

Mar. 29, 1986 [JP] Japan .................................. 61-71500

[51] Int. Cl.[4] .............................................. A01J 21/00

[52] U.S. Cl. .................................................... 425/464

[58] Field of Search ................................ 425/461-465; 228/182, 263.13, 263.15; 420/507

[56] References Cited

U.S. PATENT DOCUMENTS

| | | | |
|---|---|---|---|
| 2,195,314 | 3/1940 | Lincoln | 420/507 |
| 4,243,370 | 1/1981 | Higuchi et al. | 425/462 |
| 4,298,564 | 11/1981 | Higuchi et al. | 264/177 R |
| 4,354,820 | 10/1982 | Yomamoto et al. | 425/461 |
| 4,373,895 | 2/1983 | Yamamoto et al. | 425/461 |
| 4,465,454 | 8/1984 | Duerr et al. | 425/461 |
| 4,486,934 | 12/1984 | Reed | 425/464 |
| 4,606,981 | 8/1986 | Mizuhara | 420/507 |

FOREIGN PATENT DOCUMENTS

| | | | |
|---|---|---|---|
| 143555 | 6/1985 | European Pat. Off. | 425/465 |
| 140515 | 11/1980 | Japan . | |
| 58-3802 | 1/1983 | Japan . | |
| 59-179215 | 10/1984 | Japan . | |

*Primary Examiner*—Bernard Nozick

*Attorney, Agent, or Firm*—Parkhurst, Oliff & Berridge

[57] ABSTRACT

Ceramic honeycomb structural body-extruding dies are disclosed which each comprise a plurality of die-constituting members. The die-constituting members are bonded together with a bonding layer, and the bonding layer is composed of an acid-resisting metal.

2 Claims, 2 Drawing Sheets

DIES FOR EXTRUSION-SHAPING CERAMIC HONEYCOMB STRUCTURAL BODIES

BACKGROUND OF THE INVENTION (1) Field of the Invention

The present invention relates to dies for extruding ceramic honeycomb structural bodies (hereinafter referred to as "ceramic honeycomb structural-body extruding dies").

(2) Related Art Statement

The ceramic honeycomb structural bodies are used as catalyst carriers for purifying exhaust gases from internal combustion engines, filters for removing fine particles in exhaust gases, and heat exchangers for exhaust gases, and are produced by an extrusion-shaping process.

However, in order to improve catalyst-purifying performance and filtering performance, there has recently been a demand for enlarging the surface area in the ceramic honeycomb structural bodies. For this purpose, it is necessary that the number of cells per unit sectional area of the honeycomb structural body is increased, the thickness of partition walls is decreased, and dimensional precision is increased.

Therefore, the dies used in the extrusion-shaping process are required to have a decreased channel width, a decreased channel pitch, and higher dimensional precision.

In order to satisfy the above requirements, it is known that excellent dimensional precision extrusion-shaping dies with a channel width of not more than 0.3 mm are obtained by forming extrusion-shaping channels in the dies through plating (Japanese patent Laid-open application No. 55-140,514).

It is also known that when the shaping channels of the die as obtained by the above method are abraded with a ceramic material, desired shaping channels are regenerated by chemically dissolving off the abraded plated layer and plating them again (Japanese patent application Laid-open No. 55-140,515).

As honeycomb structural body-extruding dies, there is known an extrusion die having the structure that ceramic material-retaining portions for temporarily retaining the ceramic material therein are provided between ceramic material-supply holes to which a ceramic material is first fed from an extrusion machine and the lattice-fashioned shaping channels giving the shape of the desired ceramic honeycomb structural body (U.S. Pat. No. 3,038,201).

Further, ceramic material-flowing sections are provided between the ceramic material-supply holes and the shaping channels for uniformly flowing the ceramic material through the die (Japanese patent application Laid-open No. 54-8,661).

Japanese patent application Laid-open No. 55-140,515 relates to a method of regenerating a die as mentioned above. However, this method has a drawback in that since the plated layer of Ni or the like is dissolved off with an acid such as nitric acid, a bonding layer, by which die-constituting members are bonded together with silver solder or the like, in partially or entirely corroded with the acid.

When the bonding layer is entirely corroded, the die is decomposed into, for instance, a member having the supply holes for a ceramic material to be extruded (hereinafter referred to as a ceramic material-supply hole member), a member having extrusion-shaping ceramic material retaining portions (hereinafter referred to as a ceramic material-retaining member) and a member having shaping channels (hereinafter referred to as a shaping channel member). Consequently, the die can no longer be regenerated again.

Even if the bonding layer is partially corroded, uneven portions are formed in the corroded bonding layer, so that the flow of the ceramic material is disturbed by the unevenness. As a result, a strain remains in extrusion-shaped bodies to cause cracks therein during firing.

In the die structure disclosed in U.S. Pat. No. 3,038,201 or Japanese patent application Laid-open No. 54-8,661 in which the dimension of the shaping channels is made small and therefore the flowing of the ceramic material needs to be improved, it is necessary from the standpoint of mechanical working that the shaping channel member, the ceramic material-supply hole member, and a member having the ceramic material-flowing sections provided between the shaping channel member and the ceramic material-supply hole member (hereinafter referred to as "ceramic material-flowing member") and/or the ceramic material retaining member are separately machined, and then bonded together.

In this case, since the bonding area is small, even a small degree of corrosion largely causes the deterioration of the bonding strength. Thus, there is a problem in that the shaping channel member and the ceramic material-staying member are separated to disable the assembling thereof.

Besides the case where, as mentioned above, the plated layer in the shaping channels is dissolved off with acid and the die is regenerated through plating, there is a problem in that the useful life becomes shorter because the die is corroded with the ceramic material during the extrusion-shaping process. Thus, the composition of the ceramic material needs to be selected to prevent corrosion of the die.

SUMMARY OF THE INVENTION

The present invention has been directed toward eliminating the above problems.

More particularly, an object of the present invention is to provide a ceramic honeycomb structural body-extruding die, wherein a plurality of die-constituting members are bonded together by a bonding layer, and the bonding layer is made of an acid-resistive metal.

According to the present invention, since the ceramic honeycomb structural body-extruding die can be produced by separately machining each of a plurality of the die-constituting members, for instance, a shaping channel member, etc., and subsequently bonding them together, a complicated configuration of honeycomb structural dies or dies having thin partition walls constituting a honeycomb structure can be easily obtained.

Further, since the bonding layer is corrosion-resistant and will not be corroded with the material to be extrusion-shaped, the useful life is long.

In addition, since the bonding layer withstands the corrosive action of an acid used to dissolve off a plated layer previously applied to reduce the width of the shaping channels, a plated layer giving a uniformly narrow shaping channel width can be restored over the entire shaping channels by easily removing the plated layer after the plated layer has been abraded and plating the shaping channels again. Therefore, expensive dies having a large size and a complicated configuration can be repeatedly used through regeneration without being disposed of.

These and other objects, features, and advantages of the invention will be appreciated upon reading of the following description of the invention, with the understanding that some modifications, variations, and changes could be done by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

The present invention will be explained in more detail with reference to the attached drawings.

Figure 1:
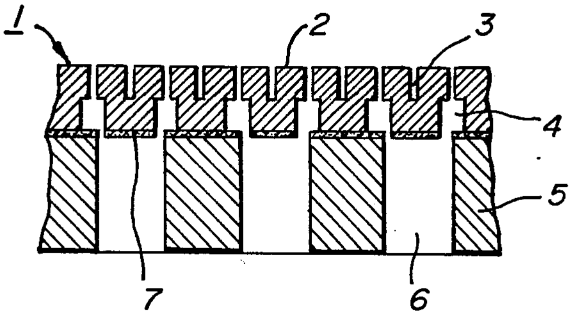
FIG. 1 is a sectional view illustrating an embodiment of the die according to the present invention.
Figure 2:
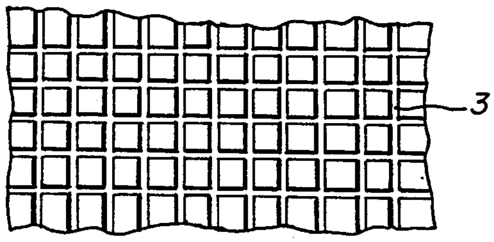
FIG. 2 is a front view of FIG. 1 as viewed from an extruding face of the die.
Figure 3:
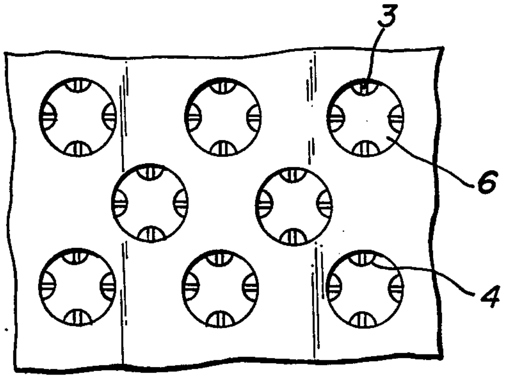
FIG. 3 is a front view of FIG. 1 as viewed from an extruding machine side.

In FIGS. 1 to 3, as illustrated in Japanese patent application Laid-open No. 54-8,661, a ceramic honeycomb structural body-extruding die 1 comprises a first metallic member 2 and a second metallic member 5. Shaping channels 3 and flowing paths 4 communicating therewith are formed in the first metallic member 2 through machining. The flowing paths 4 are each designed in the form of a hole, and are formed with selected intersections of a lattice of the shaping channels 3 as their centers.

In the second metallic member 5 are provided ceramic material-supply holes 6 to which a ceramic material is fed by an extruding machine. The ceramic material-supply holes 6 are through holes having a diameter larger than that of the flowing path 4, and are formed with selected intersections of the lattice of the shaping channels 3 as their centers.

The first metallic member 2 and the second metallic member 5 are bonded together by a bonding layer 7 to form the ceramic honeycomb structural body-extruding die 1.

The bonding layer 7 is made of a metal which will not be corroded with a plated layer-removing acid.

Any metal having an arbitrary purity or an alloy can be used as the metallic material of the bonding layer so long as it will not be corroded with the extrusion-shaping ceramic material and withstands the corroding action of the acid used for dissolving off the plated layer to adjust the width dimension of the shaping channels. The metallic material of the bonding layer must be, able to bond the die-constituting members through fusion. A metal composition consisting essentially of gold is preferable.

In a preferred embodiment according to the present invention, the bonding layer is a gold brazing layer. A gold brazing process is carried out, for instance, by a method specified in JIS Z 3266. A brazing temperature may be determined depending upon a kind of the brazing material, and selected at a temperature from about 400° to about 800° C. in view of the brazing strength.

In another preferred embodiment according to the present invention, a gold layer which is provided on one member through gold plating, gold foil deposition, gold vapor deposition, etc. is sandwiched by using another member, which is heated to from about 1,050° to about 1,080° C. to fuse the gold and bond the members together. In order to provide suitable bonding strength, the thickness of the gold layer is preferably from about 5 to 30 μm.

The width of the shaping channels may be machined to the desired thickness of the partition walls of the extrusion-shaped bodies. However, as described in Japanese patent application Laid-open No. 55-140,514, when the former is made larger than a desired dimension through the machining and then adjusted to the desired dimension through non-electrolytic plating, the desired small width channels can be attained. When the channel width becomes wider than an allowable dimension through abrasion, etc., the die can be regenerated by plating it again as described in Japanese patent application Laid-open No. 55-140,514.

Figure 4:
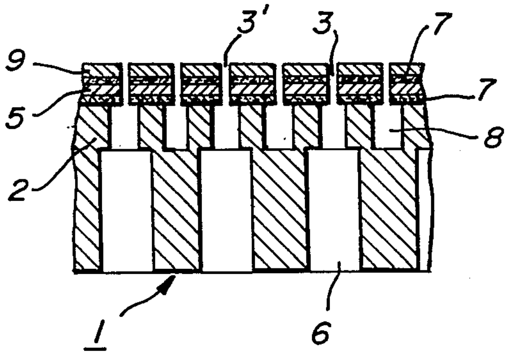
FIG. 4 is a sectional view illustrating another embodiment of the die according to the present invention.

The present invention is not restricted to the structure of the bonding layer as shown in FIGS. 1 to 3, but an extruding die 1 may be constituted as shown in FIG. 4 such that a bonding layer 7 is interposed between a first metallic member 2 in which ceramic material-supply holes 6 and ceramic material-retaining portions 8 communicating therewith are machined, a second metallic member 5 with shaping channels 3, and a third metallic member 9 provided with shaping channels 3'. This embodiment is extremely effective where the depth of the shaping channels is required to be increased to make the dimension of the partition walls of the honeycomb structural body extremely small and to produce extrusion-shaped bodies of uniform density.

In addition, although not shown, the bonding layer may be provided between the ceramic material-supply hole member, the ceramic material-staying member and the shaping channel member, or inside these members.

According to the present invention, the following effects can be attained.

Since the shaping channels having a uniform and narrow channel width can be maintained at a high precision for a long time period over the entire die, high quality and thin wall ceramic honeycomb structural bodies can be stably produced. In addition, cracking does not occur due to an uniform shaping density during firing. Furthermore, since the die can easily and simply be regenerated, expensive dies having a large size and a complicated shape can be inexpensively and precisely regenerated without being disposed of. For this reason, the dies according to the present invention enable the mass and inexpensive production of ceramic honeycomb structural bodies for the purification of exhaust gases from automobiles, catalyst carriers, filters, and rotary type heat exchangers in gas turbines, etc. and are extremely industrially useful.

As a manner of course, various modifications and variations may be effected without departing from the spirit of the invention.

What is claimed is:

1. A die for extruding ceramic honeycomb structural bodies comprising:

a laminate comprising a first metallic die-constituting member, said first die-constituting member having shaping channels and apertures communicating with said shaping channels, each of said shaping channels having a width, a second metallic die-constituting member, said second die-constituting member having ceramic material supply holes formed therethrough, said apertures communicating with said ceramic material supply holes, and a bonding layer comprising a bonding material, the bonding material consisting essentially of gold, said bonding layer being positioned between said first die-constituting member and said second die-constituting member; and a layer plated on at least said first die-constituting member to reduce the widths of said shaping channels, said layer comprising a plating material which is removable by treatment with a plate-removing acid to which said bonding layer is resistant.

2. A die for extruding ceramic honeycomb structural bodies comprising:

a laminate comprising a first metallic die-constituting member having first shaping channels, a second metallic die-constituting member having second shaping channels, said first and second die-constituting members being bonded together with a first bonding layer comprising a bonding material, the bonding material consisting essentially of gold, said first and second shaping channels each having a width, and a third metallic die-constituting member having ceramic material supply holes and ceramic material retaining holes, said ceramic material supply holes and said ceramic material retaining holes communicating with said first and second shaping channels, said third die-constituting member being bonded to the second die-constituting member with a second bonding layer comprising said bonding material; and a plating material plated on at least said first and second die-constituting members to reduce the widths of said first and second shaping channels, said plating material being removable by treatment with a plate-removing acid to which said first and second bonding layers are resistant.

* * * * *